May 15, 1945.   N. W. REDMER   2,375,945
PLUG GAUGE
Filed Feb. 17, 1941
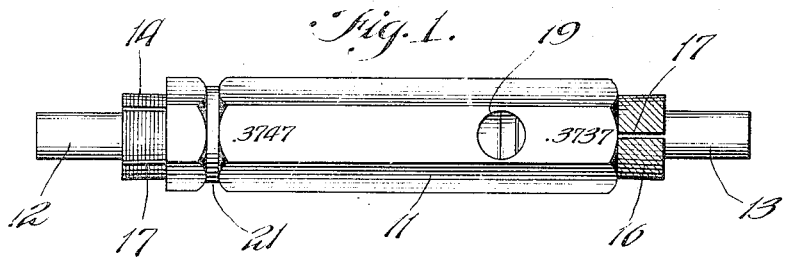
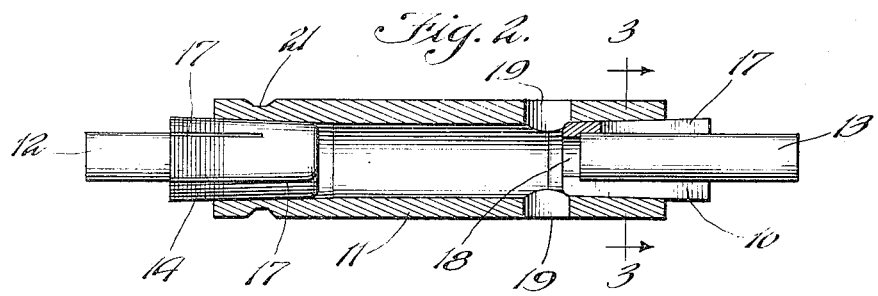
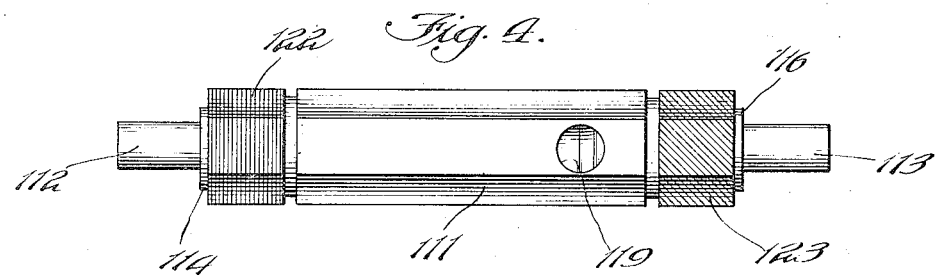
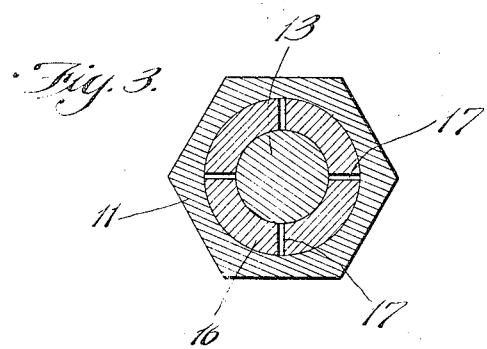
INVENTOR.
Norman W. Redmer
BY McLaughlin & Wallenstein
ATTORNEY Patented May 15, 1945

2,375,945

UNITED STATES PATENT OFFICE 2,375,945

PLUG GAUGE

Norman W. Redmer, Chicago, Ill.

Application February 17, 1941, Serial No. 379,333

10 Claims. (Cl. 33—178)

My invention relates to plug gauges of the type known as "maximum-minimum" gauges.

The principal object of the invention is the provision of an improved plug gauge.

Another object is the provision of a plug gauge having improved and simplified means for supporting a reversible gauging member in a handle.

A further object is the provision of a plug gauge of the type described provided with means for readily indicating to the user the relative sizes of two gauging members supported in the same handle.

Another object is the provision of an improved plug gauge having two reversible gauging members secured in the opposite ends of the same handle wherein the reversing of a gauge member is accomplished expeditiously, and wherein indicating means provided on the handle in association with the gauging members provides quickly discernible means for indicating to the operator the relative sizes of the gauging members and also acts as a guide to the operator in reversing the gauging members in the handle.

In accordance with the main features of the invention, I provide a hollow handle of generally cylindrical cross section, a pair of reversible gauging members of circular cross section, and a pair of collets, with at least one longitudinally extending slot, for engaging around the ends of the gauging members. By providing tapered surfaces between the inside of the handle and the exterior of the collets, the collets are caused to collapse and grip the gauging members when they are driven into the ends of the handle. The hollow handle and collets together function as a supporting device to releasably but firmly hold the gauging members in position during use. The ends of the gauging member supporting device are finished to show readily which is the smaller and which the larger gauging member, preferably by the use of green and red end surfaces, respectively, as a part of the metal.

Preferred embodiments of the invention are shown in the drawing, wherein

Fig. 1 is an elevational view showing a plug gauge constructed in accordance with the features of my invention;

Fig. 2 is a longitudinal section taken through the plug gauge of Fig. 1 with some parts shown in elevation to illustrate the construction;

Fig. 3 is a sectional view taken on the line 3—3 of Fig. 2; and

Fig. 4 is an elevational view showing a modification.

Looking now at the drawing, I provide a hollow handle 11 in opposite ends of which gauging members 12 and 13 are supported. The gauging members are adapted to be of different sizes; for example, as indicated on the drawing, there is a difference of .001 inch between the diameters of the gauges 12 and 13. The accuracy with which the gauge members 12 and 13 are finished and the amount of difference in the diameter of the two gauge members are determined by the accuracy which must be maintained in the manufactured part which is tested by means of the gauge. The gauge members 12 and 13 are reversible, being finished to accurate size throughout their lengths.

To support the gauge members 12 and 13 within the handle 11, I provide a pair of collets 14 and 16 substantially identical in form except that one may be finished with a slightly different interior dimension where there is a sufficient difference in the size of the two gauge members to warrant differentiation in the manufacture of the collets. When the difference between the diameters of the gauge members is only very slight, then the action of the collets themselves is such as to be self-corrective. Since the collets are generally identical in form, except, as stated, for a possible slight variation in the interior dimensions, they will be described as if they were identical.

Each of the collets has a plurality of end slots 17, one of which runs the entire length of the side wall, so as to provide for their being collapsed when pressure is applied exteriorly thereof and toward the axis. This pressure results preferably from forming the outside surface of the collets and inside end surface of the handle with a slight taper toward their exterior ends so that, when the collets are driven into the ends of the hollow handle, they will be collapsed and caused to engage against the exterior of the gauging members. The tendency of the collets to return to normal position provides adequate friction for retaining the entire assembly, including a collet and gauging member, in position in the end of the handle. The collets, in turn, clamp the gauging members to hold them, by friction, in proper position, and to this end may be slightly rough on their inside surfaces. Each of the collets has an open end portion 18, smaller in diameter than the gauging member so as to leave an interior annular shoulder against which the end of the gauging member engages to prevent the gauging member being driven too far into the collet. Since it is advisable in many instances to have a definite length of the gauging member projecting beyond the collet, the length of the gauging member and the position of the shoulder on the collet will determine how much of the gauging member projects in a given instance. The gauging member may be inserted only part way into the collet, if desired, and, in any case, the gauging member may be driven into, or out of, the collet when it is necessary to reverse it. The gauging member is of hard material, and is finished with a very smooth surface. The collet is normally of a softer material, such as aluminum, brass or the like.

The handle 11 is suitably formed of metal so as to be strong enough to withstand the internal pressure resulting from driving the collet and gauging member assembly into position. At one end of the handle, I provide holes 19 spaced opposite to each other, these holes occupying such a position that the end of the collet, when driven into position, will project to a point in line with these holes. By this means, a drift punch or other tool may be inserted in the holes for forcing the collet contiguous to it out of the handle, the gauging member, of course, being removed with the collet. The assembly at the other end may then be removed readily by inserting a drift punch or other suitable tool endwise of the handle and tapping it slightly.

Plug gauges of the type described are sometimes marked so that an operator can readily determine which of the two gauge members is the larger and which the smaller. A common expedient is to mark the size in the general way shown in Fig. 1, or to apply to the handle the words "plus" and "minus," or other similar short words to convey the necessary information to the operator. Occasionally, also, the handle is finished somewhat differently at one end than at the other, for example, by providing an undercut as shown at 21 in Fig. 1. In accordance with my invention, I finish the gauge in such a way as to provide two different colors at the ends of the handle, such as red to indicate the larger gauge member and green to indicate the smaller gauge member. I find that the material comprising the collet may be finished to provide the color. As an instance, the collet may be formed of aluminum, the exterior of which may be colored either a red or green by an anodic oxidation process, thereby producing a substantially permanent color as a part of the exterior of the metal.

I show a modification in Fig. 4 wherein the collets 114 and 116, respectively, are so constructed and arranged as to be driven substantially entirely within the hollow handle. In this form, it will be noted that the handle 111 is made somewhat longer than the handle shown in the first described embodiment, and the holes 119 are somewhat further from the end of the handle, so that, even though the collets be of the same length as the collets employed in the preceding embodiment, the same means may be utilized for removing them. It should be understood that changes in dimensions may be made without departing from the spirit and scope of the invention. In this form of the invention, also, the gauging members 112 and 113 may be of the same length as the gauging members 12 and 13, and thus projecting the same distance from the ends of the collets.

When employing the form of the invention shown in Fig. 4, I may provide separate end portions 122 and 123 bearing on their surfaces colors such as green and red to indicate which is the smaller and which is the larger gauge member, respectively. This color may be produced in the handle also by an anodizing process, or may, if desired, be produced by utilizing a separate indicating member which is frictionally held on the end of the handle but preferably formed of metal so as to resist being broken, torn, defaced, or otherwise injured due to continuous usage.

The gauge of my invention is advantageous not only from the standpoint of its convenience and use but also from the standpoint of simplicity of manufacture and economy of performance. So far as the manufacture is concerned, the handle and collets are relatively very inexpensive. The gauge members are finished to the tolerances required, the accuracy of the finish determining, of course, the expense which must go into their manufacture. When the projecting ends of the gauge members have shown signs of wear so that they are no longer as accurate as required, the user of the gauge very readily can reverse them by removing the two assemblies in the manner described, reversing the gauging members in their collets and again driving the collets back into position. The color referred to also acts as a guide to the operator when he is making this change. When a new plug gauge is required, it is not necessary to purchase the entire assembly, but the operator may be furnished with the gauging members only and they are readily inserted in the handle as a support. Although the gauging members are very readily removed, they are held with sufficient firmness in the handle so that there is no possibility of their becoming accidentally dislodged during use. Although it is preferable to taper the surfaces on both the collets and handle, only one or the other may be tapered. It should be borne in mind that this taper is relatively slight, such as a quarter inch in a foot. The taper is exaggerated slightly in the drawing so that it will be more apparent to the observer, but those skilled in the art will understand that only a slight taper is required. The margin of the tapered portion of the handle may operate as a stop to prevent further penetration of the collet. It will be noted that this portion is in alignment with the holes 19.

I have described my invention in detail in order that those skilled in the art may understand how to practice the same, but the invention is limited only by the scope of the appended claims.

What I claim as new and desire to protect by Letters Patent of the United States is:

1. In a plug gauge, a generally tubular handle member, a pair of gauging members of different size, each, however, being of uniform cross section, and two collets one for engaging over an end of each gauging member, each said collet having an internal shoulder for limiting the degree of insertion of the gauging member, each said collet having side walls slightly tapering outwardly away from the said shoulder and slotted to permit collapsing, whereby, when a gauging member is placed in a collet and the collet driven into the end of the handle, the collet will be held in place frictionally and will grip its associated gauging member to hold it in position.

2. In a plug gauge, a generally tubular handle member, a pair of gauging members of different size, each, however, being of uniform cross section, and two collets one for engaging over an end of each gauging member, each said collet having an internal shoulder for limiting the degree of insertion of the gauging member, each said collet having side walls slightly tapering outwardly away from the said shoulder and slotted to permit collapsing, whereby, when a gauging member is placed in a collet and the collet driven into the end of the handle, the collet will be held in place frictionally and will grip its associated gauging member to hold it in position, said gauge having two surfaces, one at each end, provided with different colors whereby to indicate visibly and readily which is the smaller and which the larger gauging member.

3. In a plug gauge, a generally tubular handle member, a pair of gauging members of different size, each, however, being of uniform cross section, and two collets one for engaging over an end of each gauging member, each said collet having an internal shoulder for limiting the degree of insertion of the gauging member, each said collet having side walls slightly tapering outwardly away from the said shoulder and slotted to permit collapsing, whereby, when a gauging member is placed in a collet and the collet driven into the end of the handle, the collet will be held in place frictionally and will grip its associated gauging member to hold it in position, said collets having their surfaces separately chemically affected to produce different colors forming part of the body of the metal of which they are comprised, whereby to show visually, which is the larger and which the smaller gauging member.

4. In a plug gauge, a generally tubular handle member, a pair of gauging members of different size, each, however, being of uniform cross section, and two collets one for engaging over an end of said gauging member, each said collet having an internal shoulder for limiting the degree of insertion of the gauging member, each said collet having side walls slightly tapering outwardly away from the said shoulder and slotted to permit collapsing, whereby, when a gauging member is placed in a collet and the collet driven into the end of the handle, the collet will be held in place frictionally and will grip its associated gauging member to hold it in position, said collets having their surfaces separately chemically affected to produce different colors forming part of the body of the metal of which they are comprised, whereby to show visually which is the larger and which the smaller gauging member, said colors being red and green respectively.

5. A handle for a pair of plug gauging members of relatively different diameters, said handle comprising a hollow body with a tubular interior, tapered outwardly near its ends and a pair of collets of substantially identical outer dimensions, adapted to be inserted in ends of said hollow body to support one end of a gauging member, each said collet having a tapered exterior surface and being split, whereby to cause it to collapse when driven into the tubular body, each said collet also having an interior shoulder to position a gauging member with respect thereto, the interior openings of said collets being uniform when collapsed whereby to grip a large area of a gauging member, and each collet having a different interior diameter whereby gauging members of different diameters are supportable at the two ends of the same handle.

6. A handle as defined in claim 5, wherein said collets are formed of aluminum, and their surfaces comprise an aluminum compound, red in color for the collet supporting the larger gauging member, and green in color for the collet supporting the smaller gauging member.

7. In a plug gauge, a generally tubular handle member, a pair of gauging members of different size, each, however, being of uniform cross section, and two collets, one for engaging over an end of each gauging member, each said collet having side walls slightly tapering outwardly and slotted to permit collapsing whereby, when a gauging member is placed in a collet and the collet driven into the end of the handle, the collet will collapse around and grip a large area of its associated gauging member to hold it in position frictionally.

8. A handle for a pair of plug gauging members of relatively different diameters, said handle comprising a hollow body with a tubular interior, tapered outwardly near its ends, and a pair of collets of substantially identical outer dimensions, adapted to be inserted in ends of said hollow body to support one end of a gauging member, each said collet having a tapered exterior surface and being split, whereby to cause it to collapse when driven into the tubular body, the interior openings of said collets being uniform when collapsed whereby to grip a large area of a gauging member, and each collet having a different interior diameter whereby gauging members of different diameters are supportable at the two ends of the same handle.

9. In a plug gauge, a handle member having an end opening having a slight outward taper, a collet adapted to be inserted in said end opening to support a gauging member, said collet having a tapered exterior surface and being split whereby to cause it to collapse when driven into said end opening, the interior opening of said collet being substantially uniform when collapsed whereby to encompass and grip a large area of said gauging member.

10. In a plug gauge, a generally tubular handle member having tapered inner end surfaces, a pair of gauging members of different size, each, however, being of uniform cross section, and two collapsible collets, one for engaging over an end of each gauging member, each said collet having side walls slightly tapered to engage in the said tapered inner end surface to cause the collet to collapse when driven into the end of the handle, and each said collet having a substantially uniform inner diameter to fit its associated gauging member, whereby when the collets are collapsed they grip a relatively large area of their associated gauging members and hold the same frictionally in position.

NORMAN W. REDMER.